Dec. 15, 1964  T. A. ST. CLAIR ET AL  3,161,049
GAS METER

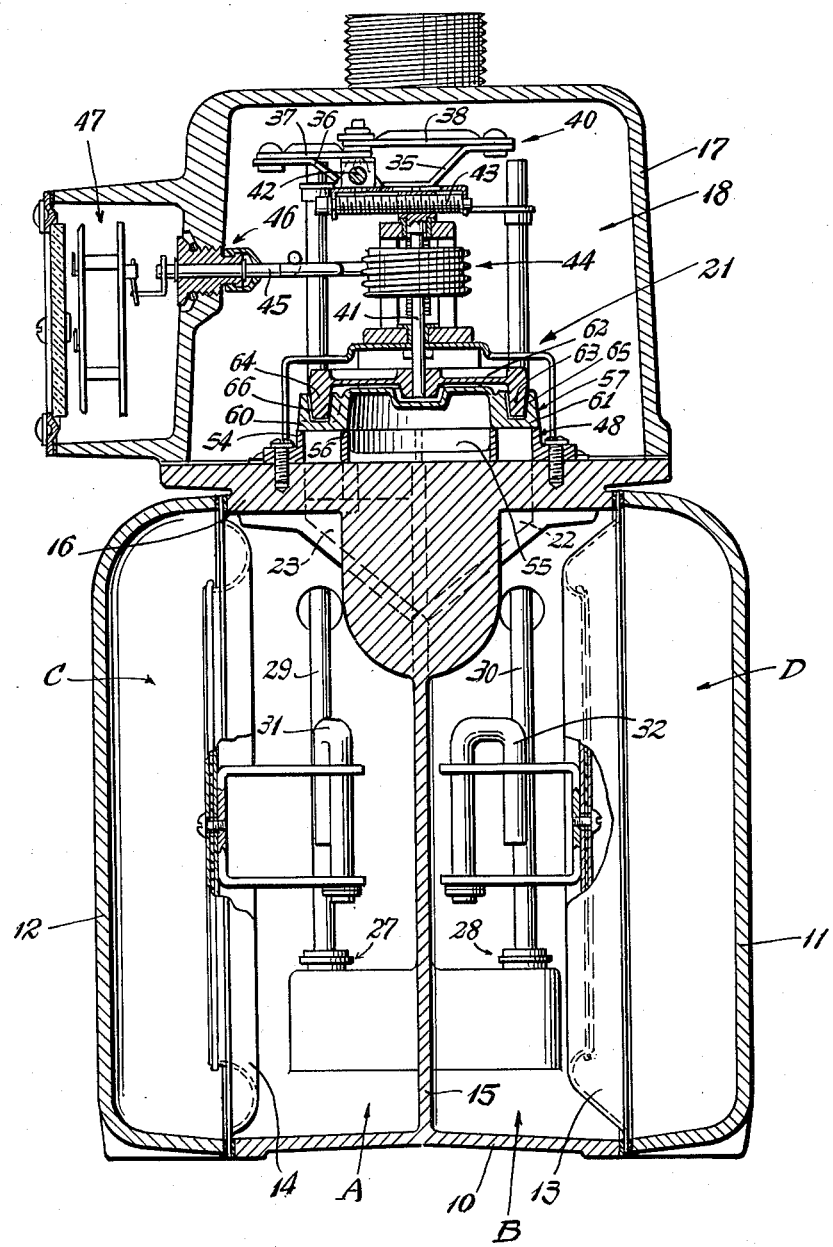

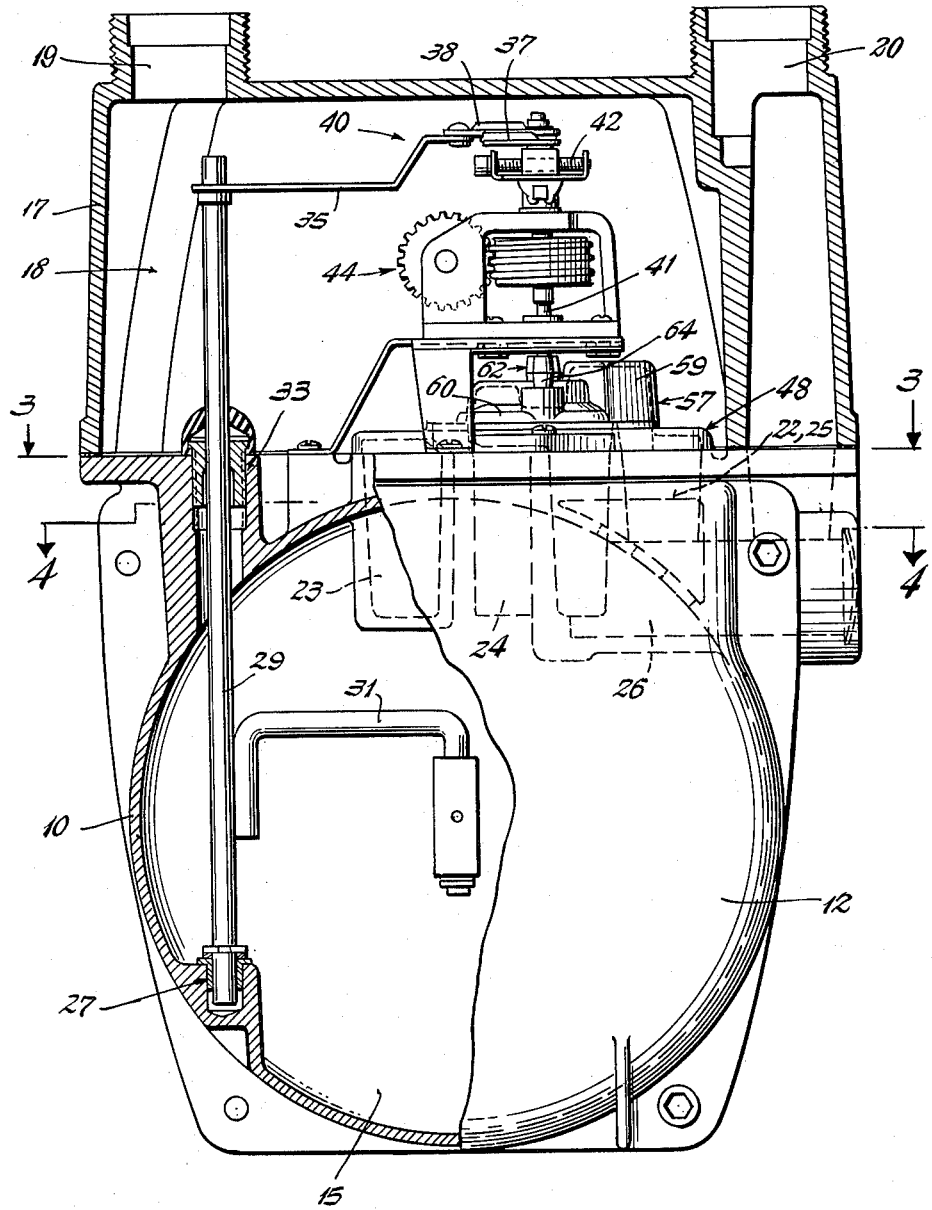

Filed Aug. 13, 1962  5 Sheets-Sheet 3

INVENTORS
Theodore A. St. Clair
Ernest L. Greenhill
BY
Johnson and Kline
ATTORNEYS Dec. 15, 1964    T. A. ST. CLAIR ETAL    3,161,049
GAS METER Filed Aug. 13, 1962    5 Sheets-Sheet 4

INVENTORS
Theodore A. St. Clair
Ernest L. Greenhill
BY
Johnson and Kline
ATTORNEYS Dec. 15, 1964 T. A. ST. CLAIR ETAL 3,161,049
GAS METER
Filed Aug. 13, 1962 5 Sheets-Sheet 5

INVENTORS
Theodore A. St. Clair
Ernest L. Greenhill
BY
Johnson and Kline
ATTORNEYS United States Patent Office 3,161,049
Patented Dec. 15, 1964

3,161,049
GAS METER
Theodore A. St. Clair, Fairfield, and Ernest L. Greenhill, Milford, Conn., assignors to Textron Inc., Providence, R.I., a corporation of Rhode Island
Filed Aug. 13, 1962, Ser. No. 216,589
5 Claims. (Cl. 73—267)

The present invention relates to a new four chamber gas meter.

It is an object of the invention to provide a meter having an improved relation of parts which results in a compact and more efficient metering operation.

This is accomplished by providing an entirely new valve mechanism, including a novel drive therefor, and in the novel location of the valve and communicating passages with the chambers.

A feature of the invention resides in the uniform operation of the valve in which the valve ports are elongate and narrow and arranged in a circle, each port is defined by narrow lands and extends for substantially 90°, and the ports are separated by a short cutoff land. The narrow lands reduce the force required to drive the valve cover resulting in a more freely operating valve. Also, the relation of the long port traverse between the short cutoff lands improves the accuracy with which timing adjustments can be made and reduces differential pressure fluctuations.

Another feature of the invention is a novel drive yoke having angled driving contact with a cover to impart a downward thrust to the cover and also drive the cover as close to the operating face thereof as possible, thus insuring a more accurate valve operation.

A further feature of the invention resides in the fact that the valve is offset laterally from the vertical center of the meter, thus providing for a more efficient porting of the outer chambers and the reduction of the height of the meter. Also, the offset permits the use of relatively long tangent flag arms connected to the operating tangent links while still retaining the compactness of the meter.

Other features of the invention will be apparent from the specification and claims when considered in connection with the accompanying drawings in which:

FIGURE 1 is a vertical section through the meter showing four measuring chambers.

FIG. 2 is a front view, partly in section, of the meter.

The meter of the present invention comprises a center or main casting 10 and front and back covers 11, 12 secured thereto for closing the open sides of the casting. Clamped between the main casting and front and back covers are substantially circular diaphragms 13, 14 which cooperate with a transverse wall 15 in the central casting to form four measuring chambers, i.e., inner chambers A, B and outer chambers C, D, as shown in FIGS. 1 and 2.

Figure 6:
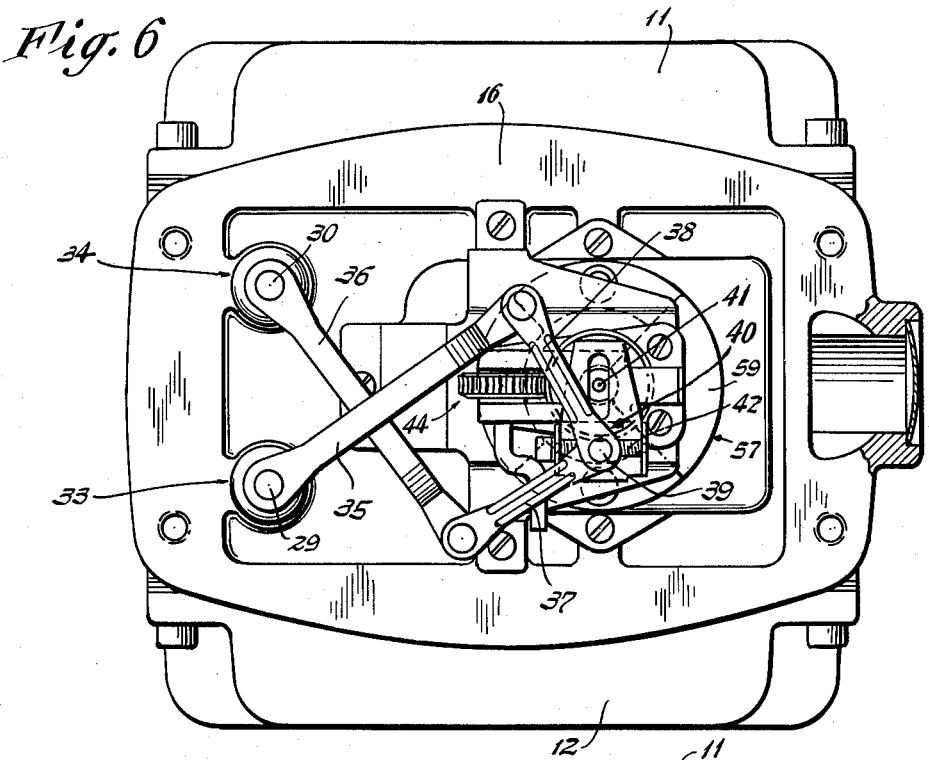
FIG. 6 is a top view of the meter with the dome removed.
Figure 3:
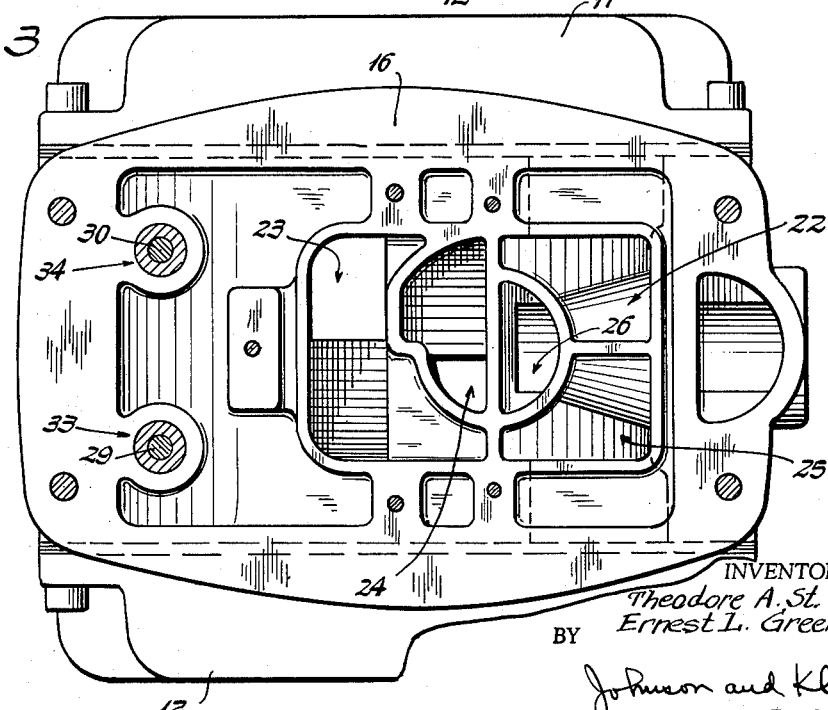
FIG. 3 is a view taken along line 3—3 of FIG. 2.
Figure 4:
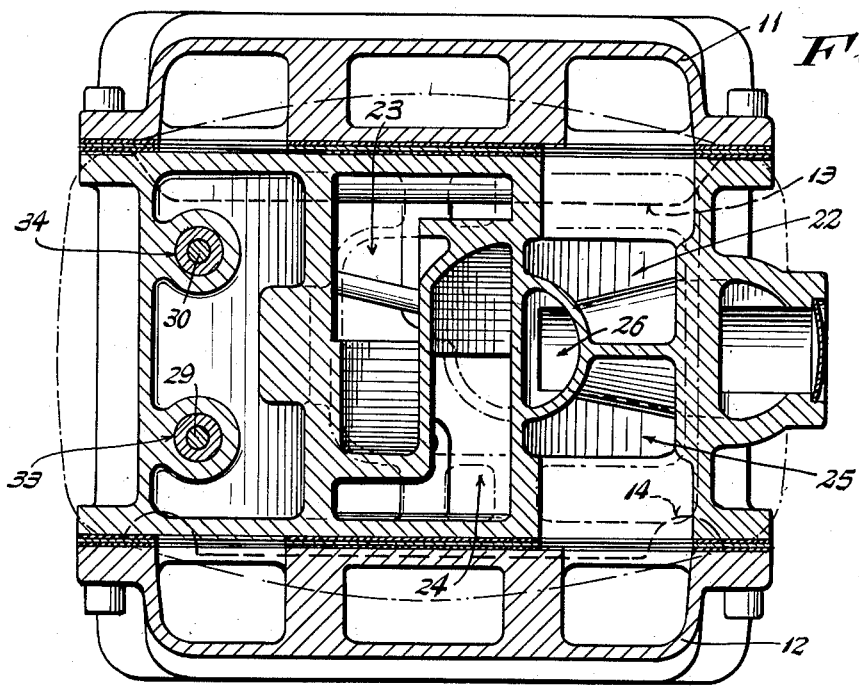
FIG. 4 is a view taken along line 4—4 of FIG. 2.
Figure 5:
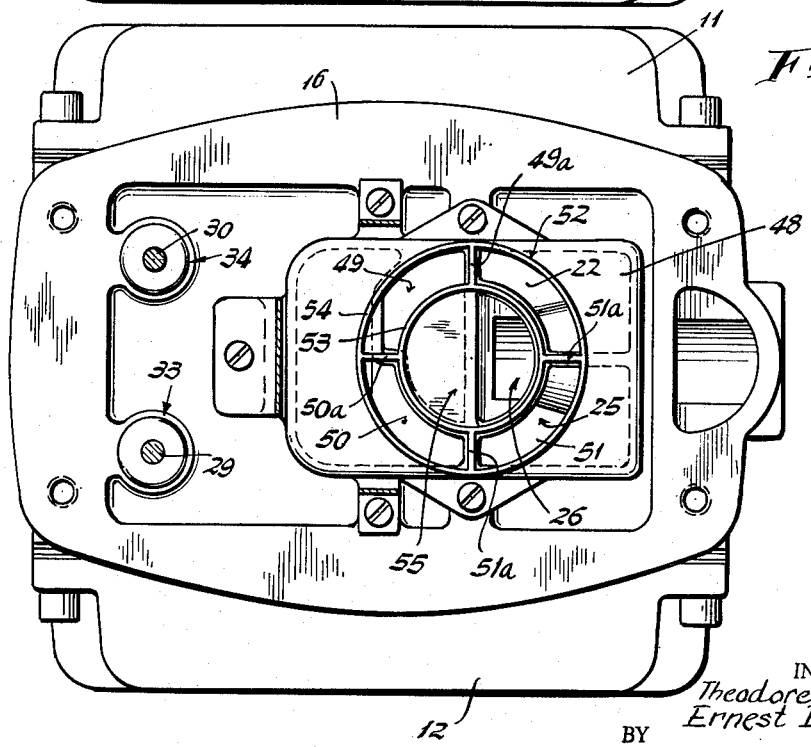
FIG. 5 is a top view of the meter with the dome and the valve cover and drive therefor removed.
Figure 7:
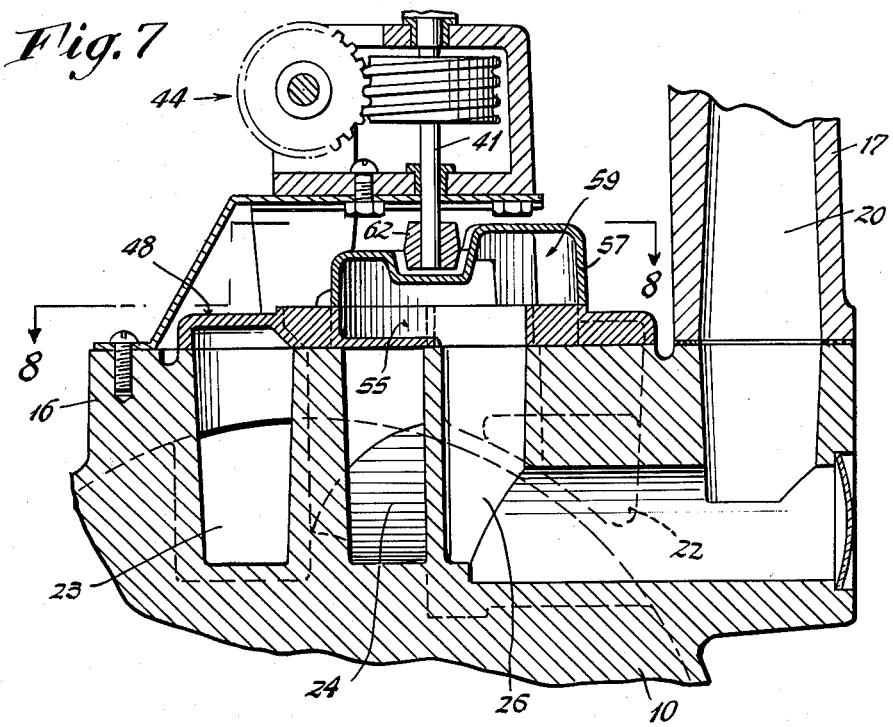
FIG. 7 is an enlarged section of the valve means as shown in FIG. 2.

The main casting has a top wall 16 supporting a cover or dome 17 which forms an inlet chamber 18. The dome has an inlet pipe 19 opening into the inlet chamber and also carries an outlet pipe 20 on the side opposite the inlet pipe. The top wall also carries valve means 21 for the meter and is provided with passages 22, 23, 24 and 25 communicating the valve means with the measuring chambers and with an outlet passage 26 connected to the outlet pipe 20 as shown in FIGS. 2 and 7.

The main casting is provided with bearings 27, 28 disposed in the inner measuring chambers on one side thereof for mounting a pair of flag shafts 29, 30 which are connected to the diaphragm by link means 31, 32 as shown in FIG. 1 for oscillation thereby in response to movement of the diaphragms during the measuring operation. The flag shafts pass through sealed bearings 33, 34 in the top wall and into the inlet chamber and are connected by flag arms 35, 36 to tangent links 37, 38 carried by a tangent post 39 connected to a tangent means 40 secured to a main drive shaft 41 to rotate the same in response to the joint oscillations of the flag shafts. The tangent means has the usual timing and speed adjustment screws 42 and 43.

The main drive shaft through suitable gearing 44 drives an index drive shaft 45 which is mounted on the dome and passes through a sealed bearing 46 to actuate an index mechanism 47 carried by the outer surface of the front of the dome.

The main drive shaft also drives the valve means to cause gas in the inlet chamber to be properly distributed to the measuring chambers and the measured gas in the measuring chambers to be fed through the outlet passage into the outlet pipe. In accordance with the present invention a novel valve means is provided herin in which a valve plate 48 is secured to the top wall 16 and is provided with four narrow, arcuate chamber ports 49, 50, 51, 52 of uniform length and width and are arranged to communicate with passages 22 to 25 extending to the measuring chambers. The ports are disposed in a circle around the axis of rotation of the main drive shaft and extend for substantially 90°, and are defined by narrow side lands 53, 54 extending therearound and are separated by narrow transverse cutoff lands 49a, 50a, 51a, 52a. The center of the valve plate within the side land 53 forms an outlet port 55 connected to the outlet passage 26. The narrow lands 53, 54, and the cutoff lands provide the means for supporting a valve cover 57 to rotate thereover and control the passage of the gas from the inlet chamber to the several measuring chambers and from the measuring chambers to the outlet pipe.

Figure 8:
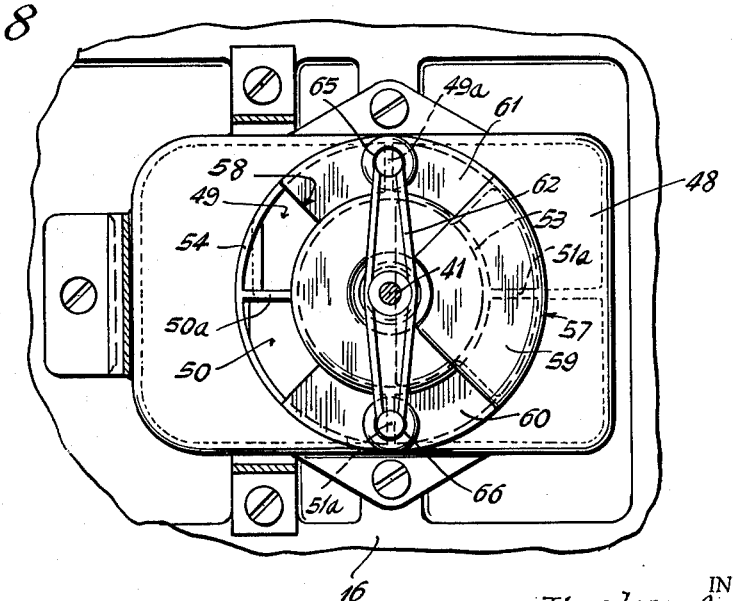
FIG. 8 is a view taken along line 8—8 of FIG. 7.

The valve cover as shown in FIGS. 1, 7 and 8 is preferably molded from a lightweight, hard, thermaly stable, wear-resisting plastic having self-lubricating properties and is circular and of a diameter to engage and be supported by the outer side land 54. It has an arcuate notch 58 in one edge of a length and width corresponding to the arcuate ports so as to open the port to the inlet chamber to permit gas from the chamber to be fed to the measuring chamber and has an arcuate closed passage 59 on the opposite edge communicating the arcuate port underlying the portion of the valve cover with the central or outlet port to permit the measured gas to pass to the outlet pipe. The remaining edges 60, 61 of the cover are solid as shown in section in FIG. 1 so as to block the ports lying thereunder.

Since the valve cover is supported only by the narrow lands, it can be rotated with a minimum of frictional resistance and with a reduced tendency to gumming resulting in a more freely operating valve and, inasmuch as the cutoff lands are precisely and uniformly spaced, accurate timing over long periods of service.

Further, the relation between the long port opening compared to the short cutoff lands between ports considerably improves the ease and accuracy with which the timing adjustments can be made and reduces differential pressure fluctuations. Also this relationship contributes to the preservation of accurate timing because the length of rotary travel which would effect timing is spread over a greater distance.

While the valve cover may be driven in various ways, it is preferably rotated by a novel drive in which a yoke 62 is secured to the main drive shaft 41 which is concentric with the valve means. The yoke has tapered pins 63, 64 disposed in oversized recesses 65, 66 formed in the opposed blocking portions 60, 61 of the valve cover. The recesses have tapered walls and extend into the cover substantially to the face of the cover engaging the valve seat and the pins are tapered for engaging the tapered walls in the recesses to effect a downward pressure on the valve cover to maintain it in good seating relation with the valve seat and at the same time provide a drive for the cover which is located closely adjacent the face of the cover and valve seat so as to provide for a smooth uniform movement of the cover over the valve seat. Because there is no frictional movement between the pins and recesses, wear in the drive is substantially eliminated.

Preferably, in accordance with the present invention, the valve mechanism is located off center, i.e., laterally of the center of the meter and toward the side of the meter opposite that carrying the flag shafts. This has several advantages in that it permits the use of longer flag arms in a compact meter to provide for a better drive for the drive shaft. Further, it enables, with a minimum of passages, the porting of the outer chambers, i.e., the chambers C, D formed by the front and back covers, since the passages 22, 25 leading to these chambers are disposed, as shown in FIGS. 2 and 7, adjacent the outside edge of an upper quadrant of the circular diaphragm in a position wherein they are located below the top edge of the diaphragm and inwardly of the side edge of the diaphragm. This results in a more compact meter than in prior meters where the passage was located on the centerline of the meter and above the diaphragm.

From the foregoing it will be seen that there is provided a compact meter having a novel valve means and drive therefor which is highly efficient in operation and simple to construct and to adjust.

Other features of the construction which result in the compactness of the meter are the positioning of the valve assembly and drive laterally of the center of the meter so that the outer chambers can be connected to the valve with a simple passage arrangement which does not increase the overall dimensions of the meter and which permits the use of long flag arms for driving the metering mechanism.

Variations and modifications may be made within the scope of the claims and portions of the improvements may be used without others.

We claim:

1. In a gas meter having a plurality of measuring chambers, an inlet chamber and an outlet passage and valve means communicating said measuring chambers sequentially to said inlet chamber and said outlet passage, the improvement wherein said valve means comprises a valve plate having a circular outlet port connected to the outlet passage surrounded by elongate, narrow, arcuate, chamber ports of uniform width, each separated by a narrow cutoff land and having a narrow marginal land therearound, a circular valve cover rotatably supported by said lands, and means including a drive yoke having spaced tapered pins disposed in a pair of opposed sockets adjacent the edge of said valve cover and actuated in response to operation of said measuring chambers for pushing said cover so as to rotate said cover on an axis passing through the center of said outlet port, said tapered pins causing said valve cover to be pressed against the lands in sealing relation therewith as an incident to the rotation thereof and said valve cover having on one edge an arcuate opening of a size equal to said arcuate chamber port for communicating the chamber ports with the inlet chamber and having on the opposing edge an arcuate passage for connecting the opposite chamber port with the outlet port, the portions of the valve cover between said arcuate opening and said arcuate passage engaging said lands and closing the cooperating chamber ports.

2. In a gas meter having a plurality of measuring chambers, an inlet chamber and an outlet passage and valve means communicating said measuring chambers sequentially to said inlet chamber and said outlet passage, the improvement wherein said valve means includes a rotatable, substantially circular valve cover adapted to control and direct the flow of gas through said valve means, and means including a drive yoke adapted to extend across said cover and having a pair of tapered surfaces engaging a pair of complementary tapered surfaces on said valve cover adjacent the periphery thereof and actuated in response to operation of said measuring chambers for rotating said cover on an axis passing through the center of said valve means, said coacting tapered surfaces pushing the cover and causing the rotation thereof and the valve cover to be pressed into sealing relation.

3. In a gas meter having a plurality of measuring chambers, an inlet chamber and an outlet passage and valve means communicating said measuring chambers sequentially to said inlet chamber and said outlet passage, the improvement wherein said valve means includes chamber ports connected to said measuring chambers and an outlet port connected to said outlet passage and a valve cover cooperating with said ports to control the flow therethrough, and means including a drive yoke having tapered pins disposed in a pair of opposed sockets in said valve cover and actuated in response to operation of said measuring chambers for rotating said cover, said tapered pins causing said valve cover to be pressed against the ports as an incident to the rotation thereof.

4. In a gas meter having a plurality of measuring chambers, an inlet chamber and an outlet passage and valve means communicating said measuring chambers sequentially to said inlet chamber and said outlet passage, the improvement wherein said valve means includes chamber ports connected to said measuring chambers and an outlet port connected to said outlet passage and a valve cover cooperating with said ports to control the flow therethrough, and means, including a transverse drive yoke having tapered pins at the ends thereof loosely disposed in a pair of opposed sockets in said valve cover adjacent the periphery thereof, actuated in response to operation of said measuring chambers for rotating said cover, said tapered pins causing said valve cover to be pressed against the ports as an incident to the rotation thereof.

5. In a gas meter having a plurality of measuring chambers, an inlet chamber and an outlet passage and valve means communicating said measuring chambers sequentially to said inlet chamber and said outlet passage, the improvement wherein said valve means includes chamber ports connected to said measuring chambers and an outlet port connected to said outlet passage and a circular valve cover having a lower supporting face and provided with means cooperating with said ports to control the flow therethrough, and means actuated in response to operation of said measuring chambers for rotating said cover, said means including a drive yoke having a pair of tapered pins loosely disposed in a pair of opposed sockets in said valve cover with the sockets extending to a point adjacent said face whereby said tapered pins apply a pushing force to said valve cover adjacent said face to rotate the cover and press the face against the ports as an incident to the rotation of the cover.

References Cited by the Examiner

UNITED STATES PATENTS

| | | | |
|---|---|---|---|
| 180,631 | 8/76 | Phillips | 73—267 |
| 247,733 | 9/81 | Foxhall | 73—267 |
| 637,424 | 11/99 | Seymour | 73—265 |
| 686,773 | 11/01 | Seymour | 73—265 |
| 847,439 | 3/07 | Ritter | 64—10 |
| 1,432,809 | 10/22 | Tolhurst | 73—267 |
| 1,788,741 | 1/31 | Reedy | 64—10 |
| 1,814,836 | 7/31 | Lederman | 64—10 |

FOREIGN PATENTS 27,602   11/08   Great Britain.

RICHARD C. QUEISSER, *Primary Examiner.*